(12) United States Patent
Duan et al.

(10) Patent No.: US 11,731,907 B2
(45) Date of Patent: Aug. 22, 2023

(54) CERAMIC MATERIAL WITH HIGH THERMAL SHOCK RESISTANCE AND HIGH EROSION RESISTANCE

(71) Applicant: Applied Materials, Inc., Santa Clara, CA (US)

(72) Inventors: Ren-Guan Duan, Fremont, CA (US); Jennifer Y. Sun, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 406 days.

(21) Appl. No.: 16/985,167

(22) Filed: Aug. 4, 2020

(65) Prior Publication Data

US 2022/0041508 A1 Feb. 10, 2022

(51) Int. Cl.
- *C04B 35/10* (2006.01)
- *C04B 35/64* (2006.01)
- *C04B 35/626* (2006.01)

(52) U.S. Cl.
CPC ........ *C04B 35/10* (2013.01); *C04B 35/62665* (2013.01); *C04B 35/64* (2013.01); *C04B 2235/3206* (2013.01); *C04B 2235/3217* (2013.01); *C04B 2235/3418* (2013.01); *C04B 2235/6567* (2013.01); *C04B 2235/76* (2013.01); *C04B 2235/9607* (2013.01)

(58) Field of Classification Search
CPC ...... C04B 35/10; C04B 35/117; C04B 35/195
See application file for complete search history.

(56) References Cited

U.S. PATENT DOCUMENTS

| | | | |
|---|---|---|---|
| 4,015,048 A | 3/1977 | Martin | |
| 5,145,540 A | 9/1992 | Foley et al. | |
| 5,168,092 A | 12/1992 | Forsythe | |
| 5,370,920 A | 12/1994 | Forsythe | |
| 6,284,693 B1 | 9/2001 | Beall | |
| 6,319,870 B1 * | 11/2001 | Beall | C04B 38/0006 428/116 |
| 6,338,906 B1 | 1/2002 | Ritland | |
| 6,388,375 B1 | 5/2002 | Pinckney | |
| 6,391,813 B1 | 5/2002 | Merkel | |
| 7,067,085 B1 | 6/2006 | Sugawara et al. | |
| 7,291,571 B2 | 11/2007 | Sprenger et al. | |
| 7,300,896 B2 | 11/2007 | Zachau et al. | |
| 7,300,898 B2 | 11/2007 | Wusirika | |
| 7,465,687 B2 | 12/2008 | Beall | |
| 7,704,296 B2 | 4/2010 | Merkel | |
| 7,906,444 B2 * | 3/2011 | Liebald | F41H 5/0435 89/36.02 |
| 7,910,506 B2 | 3/2011 | Goedeke et al. | |
| 7,927,682 B2 | 4/2011 | Beall et al. | |

(Continued)

FOREIGN PATENT DOCUMENTS

| CA | 1227811 | 10/1987 |
|---|---|---|
| EP | 0043694 | 1/1982 |

(Continued)

*Primary Examiner* — Noah S Wiese
(74) *Attorney, Agent, or Firm* — Lowenstein Sandler LLP (57) ABSTRACT

Certain embodiments of the present disclosure relate to ceramic materials with high thermal shock resistance and high erosion resistance. In one embodiment, a ceramic material is formed from a composition comprising $Al_2O_3$, MgO, $SiO_2$.

15 Claims, 7 Drawing Sheets

(56) References Cited

U.S. PATENT DOCUMENTS

| | | | |
|---|---|---|---|
| 7,964,262 B2 | 6/2011 | Brocheton et al. | |
| 8,143,180 B2 | 3/2012 | Earl et al. | |
| 8,242,039 B2 | 8/2012 | Sugawara | |
| 8,389,101 B2 | 3/2013 | Merkel | |
| 8,394,167 B2 | 3/2013 | Merkel et al. | |
| 8,501,296 B2 | 8/2013 | Merkel | |
| 8,871,676 B2 | 10/2014 | Grohol et al. | |
| 9,079,799 B2 | 7/2015 | Divens-Dutcher et al. | |
| 9,771,303 B2 | 9/2017 | Isoda et al. | |
| 9,801,435 B2 | 10/2017 | Dymshits et al. | |
| 9,868,670 B2 * | 1/2018 | Backhaus-Ricoult | C04B 35/64 |
| 10,207,948 B2 | 2/2019 | Schneider et al. | |
| 2007/0099793 A1 | 5/2007 | Wilson | |
| 2008/0096758 A1 | 4/2008 | Unno et al. | |
| 2009/0297764 A1 | 12/2009 | Beall et al. | |
| 2013/0095994 A1 | 4/2013 | Kawahara et al. | |
| 2016/0347665 A1 | 12/2016 | Divens-Dutcher et al. | |
| 2018/0037493 A1 * | 2/2018 | Schneider | C04B 35/195 |
| 2018/0186687 A1 | 7/2018 | Sridharan et al. | |

FOREIGN PATENT DOCUMENTS

| | | |
|---|---|---|
| EP | 0227482 | 7/1987 |
| EP | 0289222 | 11/1988 |
| EP | 1079373 | 2/2001 |
| WO | 9700836 | 1/1997 |
| WO | 2009070341 | 6/2009 |

* cited by examiner

CERAMIC MATERIAL WITH HIGH THERMAL SHOCK RESISTANCE AND HIGH EROSION RESISTANCE

TECHNICAL FIELD

Embodiments of the disclosure relate to chamber components, coatings for chamber components, and methods of forming the same from erosion resistant ceramic materials.

BACKGROUND

Various semiconductor manufacturing processes utilize high temperatures, high energy plasmas, mixtures of corrosive gases, high stress, and combinations thereof. These extreme conditions often result in the erosion of chamber components and the generation of particle contaminants. To mitigate these extreme conditions, chamber components are generally formed from or coated with ceramic materials with high resistance to plasma erosion. However, such materials are often prone to thermal shock at high process temperatures, resulting in crack formation and particle generation.

SUMMARY

Described in embodiments herein are ceramic materials having high thermal shock resistance and high erosion resistance, components formed from the same, and methods for producing the same. In one aspect, a component adapted for use in a semiconductor processing chamber comprises a ceramic material formed from a composition comprising: about 40 wt % to 80 wt % of $Al_2O_3$; about 10 wt % to 50 wt % of MgO; and about 2 wt % to 30 wt % of $SiO_2$, provided that the amounts of each of the $Al_2O_3$, the MgO, and the $SiO_2$ sum to 100 wt % or less.

In some embodiments, the ceramic material comprises at least one phase comprising one or more of a sapphirine phase, a cordierite phase, a spinel phase, or an enstatite phase. In some embodiments, the ceramic material comprises a sapphirine phase. In some embodiments, the ceramic material is substantially non-porous.

In some embodiments, the composition comprises: about 55 wt % to 70 wt % of $Al_2O_3$; about 25 wt % to 35 wt % MgO; and about 5 wt % to 20 wt % $SiO_2$.

In some embodiments, the ceramic material is thermal shock resistant up to about 300° C. In some embodiments, an erosion rate of the ceramic material when exposed to plasma is within about 50% of an erosion rate for ceramic material consisting essentially of $Y_2O_3$.

In some embodiments, the ceramic material is formed by sintering the composition at a temperature of about 1000° C. to about 1600° C. for a duration of about 2 minutes to about 10 hours. In some embodiments, the ceramic material is formed by plasma-spraying the composition.

In some embodiments, the component is selected from a group consisting of: a heater, an electrostatic chuck, a nozzle, a gas distribution plate, a showerhead, an electrostatic chuck component, a chamber wall, a liner, a liner kit, a gas line, a lid, a chamber lid, a nozzle, a single ring, a processing kit ring, a base, a shield, a plasma screen, a flow equalizer, a cooling base, a chamber viewport, a bellow, a faceplate, and a selectivity modulating device.

In another aspect, a ceramic material is formed by sintering a composition comprising: about 55 wt % to 70 wt % of $Al_2O_3$; about 25 wt % to 35 wt % MgO; and about 5 wt % to 20 wt % $SiO_2$, provided that the amounts of each of the $Al_2O_3$, the MgO, and the $SiO_2$ sum to 100 wt % or less. In some embodiments, the ceramic material is substantially non-porous and comprises at least one phase comprising a sapphirine phase. In some embodiments, the ceramic material is thermal shock resistant up to about 300° C. In some embodiments, an erosion rate of the ceramic material when exposed to plasma is within about 50% of an erosion rate for ceramic material consisting essentially of $Y_2O_3$.

In another aspect, a method of forming a component adapted for use in a semiconductor processing chamber (e.g., any of the aforementioned components) comprises forming a ceramic material from a powder composition comprising: about 40 wt % to 80 wt % of $Al_2O_3$; about 10 wt % to 50 wt % of MgO; and about 2 wt % to 30 wt % of $SiO_2$, provided that the amounts of each of the $Al_2O_3$, the MgO, and the $SiO_2$ sum to 100 wt % or less. In some embodiments, the method comprises sintering the composition at a temperature of about 1000° C. to about 1600° C. for a duration of about 2 minutes to about 10 hours to form the ceramic material. In some embodiments, the method comprises plasma-spraying the composition to form the ceramic material.

As used herein, "weight percent" or "wt %" refers to a ratio of weight of a component with respect to a total weight of a composition in which the component is present. For example, if a composition comprises 20 wt % of component A and 40 wt % of component B, this means that for every 100 grams of the composition, 20 grams of component A and 40 grams of component B are present, with the balance of the weight corresponding to one or more other components.

BRIEF DESCRIPTION OF THE DRAWINGS

The present disclosure is illustrated by way of example, and not by way of limitation, in the figures of the accompanying drawings in which like references indicate similar elements, wherein.

DETAILED DESCRIPTION

Embodiments described herein relate to oxide ceramic materials that exhibit high thermal shock and high erosion resistance. Certain embodiments exhibit thermal shock resistance of up to 300° C. or greater, while also demonstrating erosion resistance (e.g., to plasma during semiconductor manufacturing processes) comparable to rare earth metal-containing ceramic materials, such as $Y_2O_3$. The ceramic material may utilized to produce semiconductor processing chamber components that comprise the ceramic material in bulk form, or utilized to form protective coatings on semiconductor processing chamber component surfaces.

Critical chamber components often fail due to thermal shock and plasma/radical erosion, especially during plasma-enhanced chemical vapor deposition processes where the temperature is high and the component is exposed to a capacitively-coupled plasma and radicals. The ceramic materials described herein successfully overcome this drawback of current ceramics by simultaneously exhibiting high thermal shock resistance and high erosion resistance (e.g., to plasmas), allowing chamber components to be made from or coated with ceramic materials with longer life times under extreme conditions.

In some embodiments, the ceramic material is formed from oxides of $Al_2O_3$, MgO, and $SiO_2$ and contains mixed phases, such as sapphirine ($Mg_4Al_{10}Si_2O_{23}$) mixed with cordierite ($Mg_2Al_4Si_5O_{18}$). In some embodiments, the ceramic material is formed by sintering a powder having a composition comprising 40-80 wt % $Al_2O_3$, 10-50 wt % MgO, and 2-30 wt % $SiO_2$. The resulting ceramic materials exhibit high thermal shock resistance compared to ceramics formed exclusively from $Al_2O_3$, MgO, and $SiO_2$, as well as compared to rare earth metal-containing ceramics such as $Y_2O_3$.

The embodiments of the present disclosure provide several advantages over other ceramic oxides used in semiconductor processing chambers. These advantages include, but are not limited to: (1) high thermal shock resistance compared to other commonly used oxide materials, such as $Y_2O_3$, $Al_2O_3$, MgO, $SiO_2$, and quartz; (2) erosion resistance that is comparable to (e.g., within about 50% of) that of $Y_2O_3$, while being significantly more erosion resistant than other oxides, such as $Al_2O_3$ and quartz; (3) increased component life time; (4) reduced particle generation and impurities; and (4) high performance while being free of rare earth metal-containing oxides.

Figure 1:
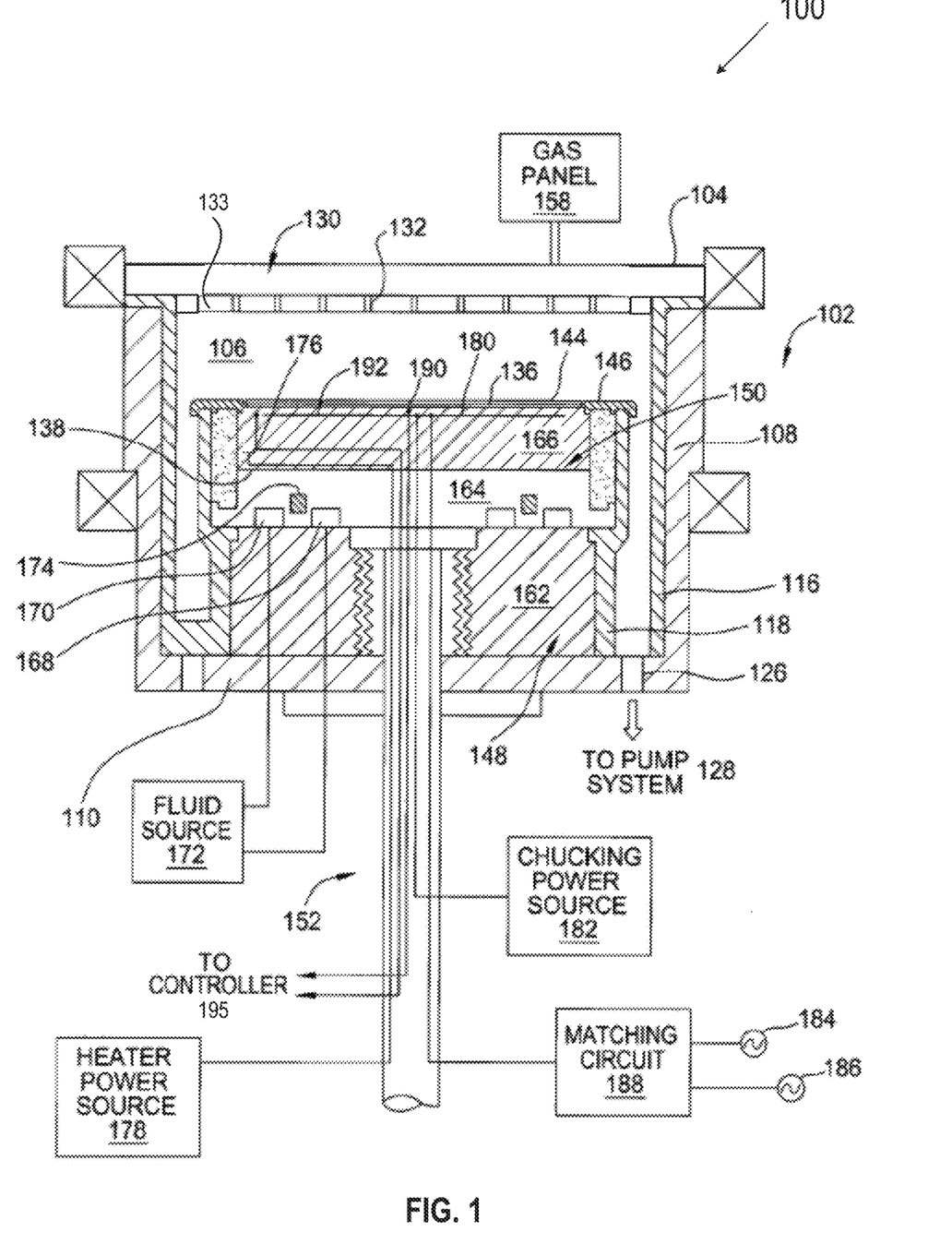
FIG. 1 depicts a sectional view of an illustrative semiconductor processing chamber.

FIG. 1 is a sectional view of a semiconductor processing chamber 100 having one or more chamber components that are formed from and/or coated with the ceramic material with high thermal shock resistance and high erosion resistance described herein. The base materials of the processing chamber 100 may include one or more of aluminum (Al), titanium (Ti) and stainless steel (SST). The processing chamber 100 may be used for processes in which a corrosive plasma environment having plasma processing conditions is provided. For example, the processing chamber 100 may be a chamber for a plasma etcher or plasma etch reactor, a plasma cleaner, plasma enhanced chemical vapor deposition (CVD) or ALD reactors and so forth. Examples of chamber components that may include a coating layer (e.g., a ceramic coating) include a substrate support assembly 148, an electrostatic chuck (ESC) assembly 150, a ring (e.g., a process kit ring or single ring), a chamber wall, a base, a gas distribution plate, a showerhead, a liner, a liner kit, a shield, a plasma screen, a flow equalizer, a cooling base, a chamber viewport, a chamber lid, and so on. Coatings may be deposited on the components using various techniques, such as ALD, sputtering, ion assisted deposition, plasma spray coating, CVD, or other suitable techniques as would be appreciated by one of ordinary skill in the art. As illustrated, the substrate support assembly 148 has a ceramic coating layer 136, in accordance with one embodiment. However, it should be understood that any of the other chamber components, such as those listed above, may also include a coating layer.

Another example of a chamber component that may include a coating is a high temperature heater assembly. In some embodiments, the ceramic material, which is described in greater detail below, is applied as a coating by ALD. ALD allows for the application of a conformal coating of a substantially uniform thickness that is porosity-free on all types of components with complex shapes and features having high aspect ratios. A thin coating deposited with ALD may maintain the electrical properties and relative shape and geometric configuration of the component so as to not disturb its functionality. The coating may also reduce the volatility of the component's materials and may form reactants having a lower vapor pressure than the component's underlying materials.

In one embodiment, the processing chamber 100 includes a chamber body 102 and a showerhead 130 that enclose an interior volume 106. The showerhead 130 may include a showerhead base and a showerhead gas distribution plate. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel or other suitable material, such as titanium. The chamber body 102 generally includes sidewalls 108 and a bottom 110. In some embodiments, the chamber body 102 may be formed at least partially from, or coated by, a thermal shock resistant and high erosion resistant ceramic material as discussed in greater detail below. One or more of the showerhead 130 (or lid and/or nozzle), sidewalls 108 and/or bottom 110 may include a coating layer.

An outer liner 116 may be disposed adjacent the sidewalls 108 to protect the chamber body 102. The outer liner 116 may be fabricated and/or coated with a coating layer. In one embodiment, the outer liner 116 is fabricated from aluminum oxide. In one embodiment, the outer liner 116 is fabricated from one of the oxide ceramic materials disclosed herein.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewall 108 of the chamber body 102. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle. Showerhead 130 may be used for processing chambers used for dielectric etch (etching of dielectric materials). The showerhead 130 includes a gas distribution plate (GDP) 133 having multiple gas delivery holes 132 throughout the GDP 133. The showerhead 130 may include the GDP 133 bonded to an aluminum or an anodized aluminum showerhead base 104. The GDP 133 may be made from Si or SiC, or may be a ceramic such as $Y_2O_3$, $Al_2O_3$, YAG, and so forth. The gas delivery plate may alternatively be composed of one of the oxide ceramic materials disclosed herein.

For processing chambers used for conductor etch (etching of conductive materials), a lid may be used rather than a showerhead. The lid may include a center nozzle that fits into a center hole of the lid. The lid may be a ceramic such as $Al_2O_3$, $Y_2O_3$, YAG, or a ceramic compound composed of $Y_4Al_2O_9$ and a solid-solution of $Y_2O_3$—$ZrO_2$. The nozzle may also be a ceramic, such as $Y_2O_3$, YAG, or the ceramic compound composed of $Y_4Al_2O_9$ and a solid-solution of $Y_2O_3$—$ZrO_2$. The lid, showerhead base 104, GDP 133 and/or nozzle may optionally be coated with a ceramic coating. The lid and/or the nozzle may alternatively be composed of one of the oxide ceramic materials disclosed herein.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $Cl_2$, $CCl_4$, $BCl_3$ and $SiF_4$, among others, and other gases such as $O_2$ or $N_2O$. The ceramic materials described herein may be resistant to erosion from some or all of these gases and/or plasma generated from these gases. Examples of carrier gases include $N_2$, He, Ar, and other gases inert to process gases (e.g., non-reactive gases).

The substrate support assembly 148 is disposed in the interior volume 106 of the processing chamber 100 below the showerhead 130 or lid. The substrate support assembly 148 holds the substrate 144 during processing. A ring 146 (e.g., a single ring) may cover a portion of the ESC assembly 150, and may protect the covered portion from exposure to plasma during processing. The ring 146 may be silicon or quartz in one embodiment.

An inner liner 118 may be coated on the periphery of the substrate support assembly 148. The inner liner 118 may be a halogen-containing gas resistant material such as those discussed with reference to the outer liner 116. In one embodiment, the inner liner 118 may be fabricated from the same materials of the outer liner 116. Additionally, the inner liner 118 may be coated with a ceramic coating.

In one embodiment, the substrate support assembly 148 includes a mounting plate 162 supporting a pedestal 152, and an ESC assembly 150. The ESC assembly 150 further includes a thermally conductive base 164 and an electrostatic puck 166 bonded to the thermally conductive base by a bond 138, which may be a silicone bond in one embodiment. An upper surface of the electrostatic puck 166 is covered by the ceramic coating layer 136 in the illustrated embodiment. In one embodiment, the ceramic coating layer 136 is disposed on the upper surface of the electrostatic puck 166. In another embodiment, the ceramic coating layer 136 is disposed on the entire exposed surface of the ESC assembly 150 including the outer and side periphery of the thermally conductive base 164 and the electrostatic puck 166. The mounting plate 162 is coupled to the bottom 110 of the chamber body 102 and includes passages for routing utilities (e.g., fluids, power lines, sensor leads, etc.) to the thermally conductive base 164 and the electrostatic puck 166.

The thermally conductive base 164 and/or electrostatic puck 166 may include one or more optional embedded heating elements 176, embedded thermal isolators 174 and/or conduits 168, 170 to control a lateral temperature profile of the substrate support assembly 148. The conduits 168, 170 may be fluidly coupled to a fluid source 172 that circulates a temperature regulating fluid through the conduits 168, 170. The embedded isolator 174 may be disposed between the conduits 168, 170 in one embodiment. The heating elements 176 are regulated by a heater power source 178. The conduits 168, 170 and heating elements 176 may be utilized to control the temperature of the thermally conductive base 164, thus heating and/or cooling the electrostatic puck 166 and a substrate (e.g., a wafer) 144 being processed. The temperature of the electrostatic puck 166 and the thermally conductive base 164 may be monitored using a plurality of temperature sensors 190, 192, which may be monitored using a controller 195.

The electrostatic puck 166 may further include multiple gas passages such as grooves, mesas and other surface features, which may be formed in an upper surface of the puck 166 and/or the ceramic coating layer 136. The gas passages may be fluidly coupled to a source of a heat transfer (or backside) gas such as helium via holes drilled in the puck 166. In operation, the backside gas may be provided at controlled pressure into the gas passages to enhance the heat transfer between the electrostatic puck 166 and the substrate 144. The electrostatic puck 166 includes at least one clamping electrode 180 controlled by a chucking power source 182. The electrode 180 (or other electrode disposed in the puck 166 or base 164) may further be coupled to one or more RF power sources 184, 186 through a matching circuit 188 for maintaining a plasma formed from process and/or other gases within the processing chamber 100. The sources 184, 186 are generally capable of producing an RF signal having a frequency from about 50 kHz to about 3 GHz, with a power output of up to about 10,000 Watts. In one embodiment, the electrostatic puck 166 is composed at least partially of one of the oxide ceramic materials disclosed herein.

The resistance of the coating and/or bulk oxide ceramic materials discussed herein to plasma may be measured through "etch rate" (ER), which may have units of micrometer/hour (μm/hr) or Angstrom/hour (Å/hr), throughout the duration of the components' operation and exposure to plasma. Measurements may be taken after different processing times. For example, measurements may be taken before processing, or at about 50 processing hours, or at about 150 processing hours, or at about 200 processing hours, and so on. Variations in the composition of the coating grown or deposited on the heater support and/or other components may result in multiple different plasma resistances or erosion rate values. Additionally, a coating or bulk ceramic with a single composition exposed to various plasmas could have multiple different plasma resistances or erosion rate values. For example, a plasma resistant material may have a first plasma resistance or erosion rate associated with a first type of plasma and a second plasma resistance or erosion rate associated with a second type of plasma.

Figure 2A:
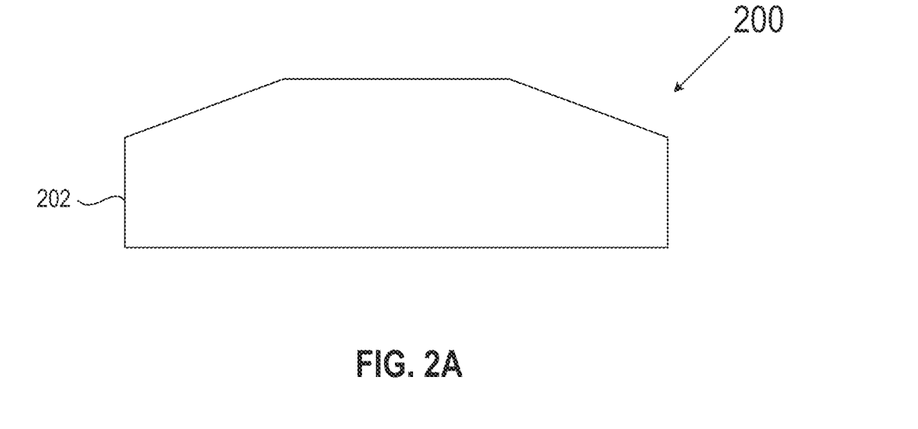
FIG. 2A depicts a portion of a component formed from a ceramic material in accordance with embodiments of the disclosure.

FIG. 2A depicts a portion of a component 200 (such as any of the components described with respect to FIG. 1) formed from a ceramic material in accordance with embodiments of the disclosure. The body 202 of the component 200 may include, for example, flat surfaces, patterned surface, and/or irregular surfaces that include edges, curves, apertures, and other features. In some embodiments, the body is a sintered ceramic material that exhibits high thermal shock resistance and high erosion resistance (e.g., a ceramic material formed by sintering a powder of 40-80 wt % $Al_2O_3$, 10-50 wt % MgO, and 2-30 wt % $SiO_2$).

Figure 2B:
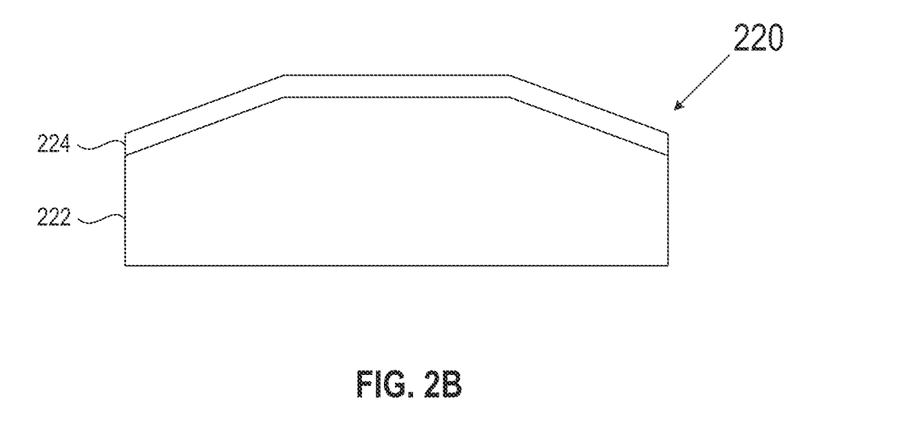
FIG. 2B depicts a portion of a component having formed thereon a ceramic material coating in accordance with embodiments of the disclosure.

FIG. 2B depicts a portion of a component 220 having formed thereon a ceramic material coating in accordance with embodiments of the disclosure. In some embodiments, the component 200 is formed from a body 222 that is formed from a thermal shock resistant and high erosion resistant ceramic material (e.g., similar to the body 202) or another suitable material used to form a semiconductor processing chamber component (e.g., AlN, $Al_2O_3$, graphite, a rare earth metal-containing ceramic, etc.). The body 22 has a coating 224 formed thereon, which may be a conformal coating (e.g., an ALD or CVD deposited coating) or a coating deposited by a line-of-sight deposition method (e.g., such as plasma spray, ion assisted deposition, physical vapor deposition, etc.). In some embodiments, the coating 224 is formed from a thermal shock resistant and high erosion resistant ceramic material. The coating 224 may have a thickness of about 5 nm to about 5000 nm, about 5 nm to about 1000 nm, about 100 nm to about 5000 nm, or about 100 nm to about 500 nm.

Figure 2C:
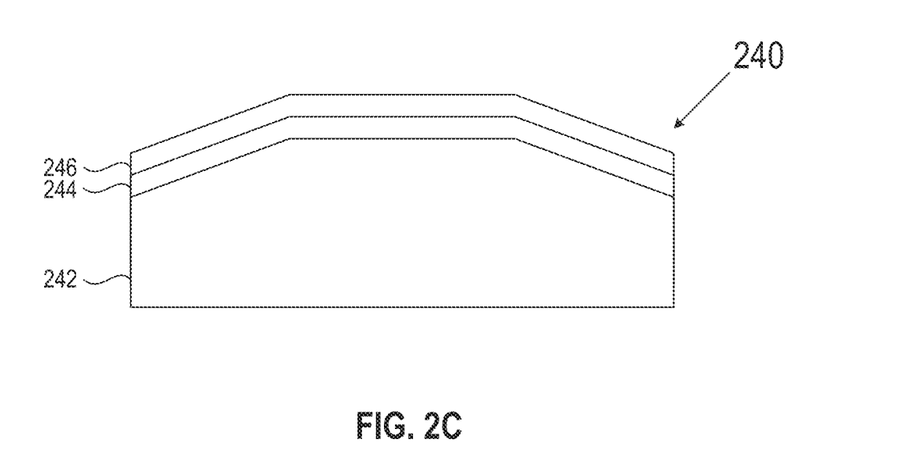
FIG. 2C depicts a portion of a component having multiple ceramic material coatings formed thereon in accordance with embodiments of the disclosure.

FIG. 2C depicts a portion of a component 240 having multiple ceramic material coatings formed thereon in accordance with embodiments of the disclosure. The component 240 is formed from a body 242 similar to the body 202 or the body 222. The body 242 is coated with a stack that includes two or more coatings, such as coating 244 and coating 246. The coatings 244 and 246 may be formed from the same or different materials, with one or more comprising a rare earth metal-containing ceramic, a ceramic material exhibiting high thermal shock resistance and high erosion resistance, or another suitable material. In some embodiments, the coating 244 may be an adhesion layer that promotes adhesion between the body 242 and the coating 246. For example, the coating 244 may be a CVD carbon bonding layer comprising amorphous carbon formed by CVD. The carbon bonding layer may be a pyrolytic carbon bonding layer, which may promote bonding of the coating 246.

In some embodiments, the body 242 may have a different coefficient of thermal expansion (CTE) than its corresponding coatings. The greater the mismatch in the CTE between two adjacent materials, the greater the likelihood that one of those materials will eventually crack, peel away, or otherwise lose its bond to the other material. In some embodiments, the coating 244, for example, may be formed in such a way to minimize the CTE mismatch between the coating 246 and the body 242 such that a difference between the two CTEs is within 10% of that of the body 242. This may be achieved by varying a ratio of rare earth metal-containing compounds present in the coating 244.

Figure 3A:
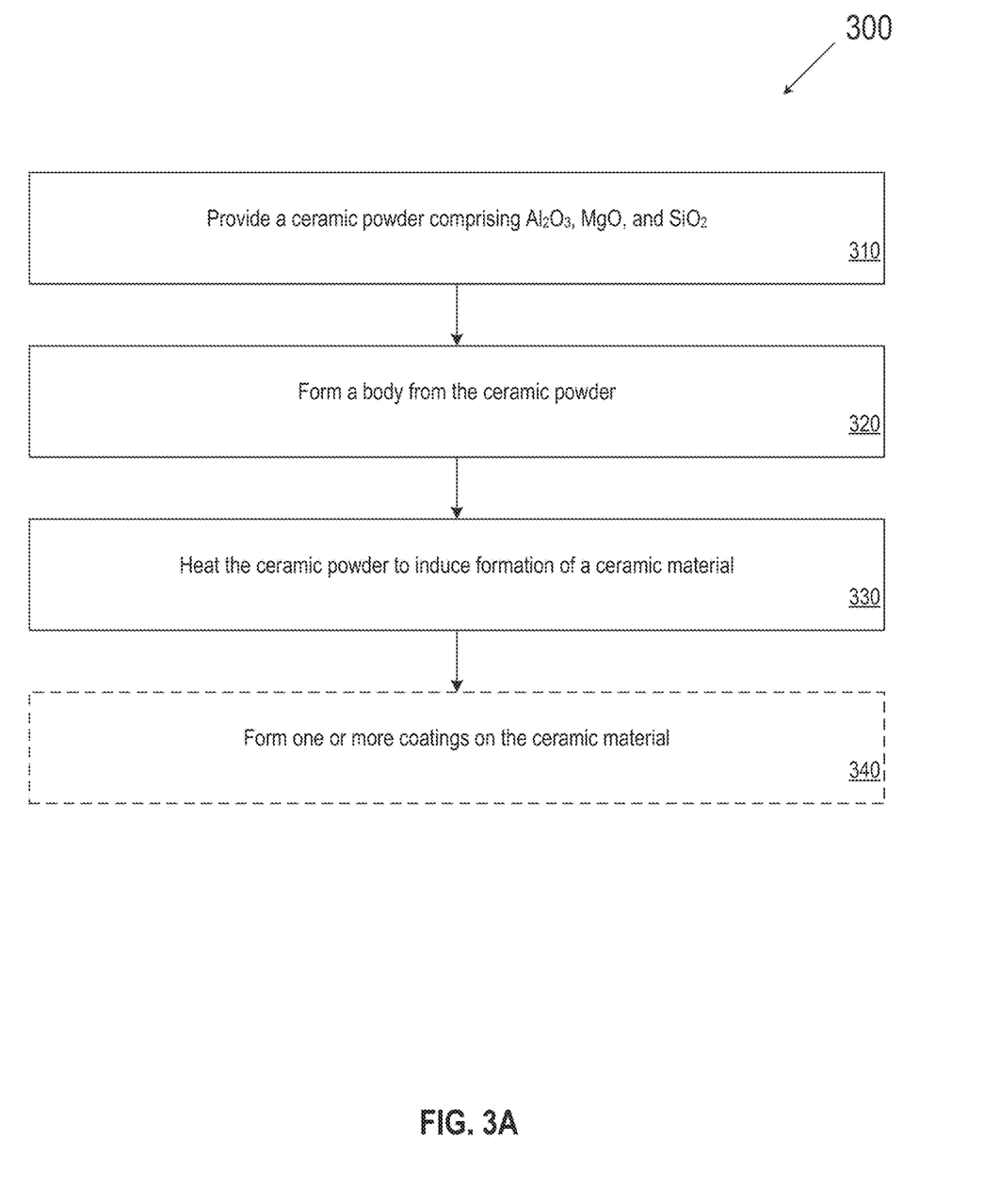
FIG. 3A illustrates a method of forming a bulk ceramic material in accordance with embodiments of the disclosure.
Figure 3B:
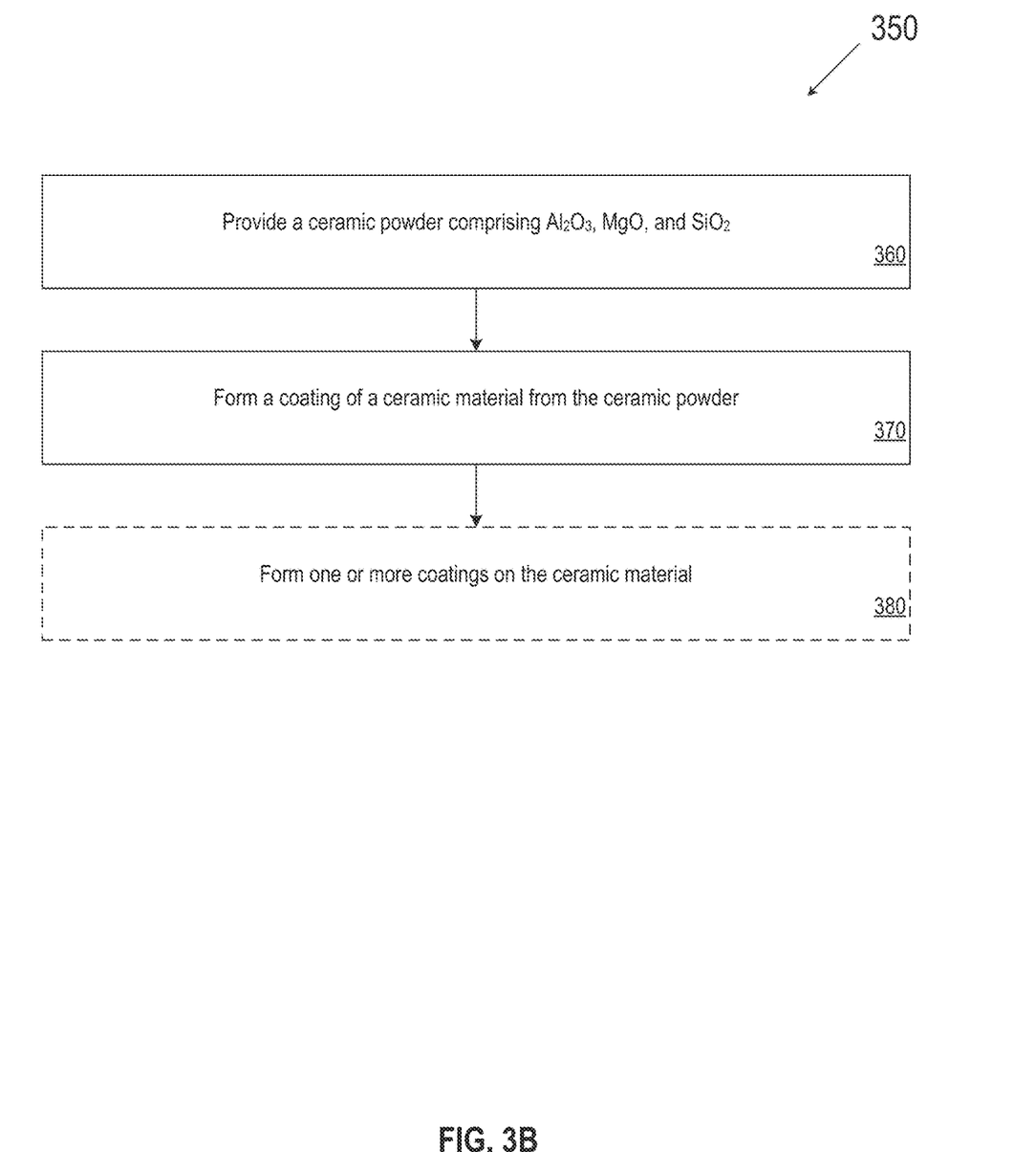
FIG. 3B illustrates a method of forming a ceramic coating in accordance with embodiments of the disclosure.

FIG. 3A illustrates a method 300 of forming a bulk ceramic material in accordance with embodiments of the disclosure. Similarly, FIG. 3B illustrates a method 350 of forming a ceramic coating in accordance with embodiments of the disclosure. The methods 300 and 350 may be used to form a bulk ceramic material and a ceramic coating, respectively, from a ceramic material with high thermal shock resistance and high erosion resistance. The methods 300 and 350 may be used to form or coat, respectively, one or more components adapted for use in a semiconductor processing chamber, such as a component described with respect to FIG. 1. For example, in one embodiment, the component is a heater, an electrostatic chuck, a nozzle, a gas distribution plate, a showerhead, an electrostatic chuck component, a chamber wall, a liner, a liner kit, a gas line, a lid, a chamber lid, a nozzle, a single ring, a processing kit ring, a base, a shield, a plasma screen, a flow equalizer, a cooling base, a chamber viewport, a bellow, a faceplate, or a selectivity modulating device. In another embodiment, the component is a high temperature susceptor. In another embodiment, the component is a high temperature heater. In another embodiment, the component is an electrostatic chuck (e.g., as represented by the ESC assembly 150 of FIG. 1).

Referring to FIG. 3A, at block 310, a ceramic powder comprising $Al_2O_3$, MgO, and $SiO_2$ is provided. The composition of the powder may comprises, for example, about 40 wt % to 80 wt % of $Al_2O_3$, about 10 wt % to 50 wt % of MgO, and about 2 wt % to 30 wt % of $SiO_2$, provided that the amounts of each of the $Al_2O_3$, the MgO, and the $SiO_2$ sum to 100 wt % or less.

In one embodiment, the composition comprises about 55 wt % to 70 wt % of $Al_2O_3$, about 25 wt % to 35 wt % MgO, and about 5 wt % to 20 wt % $SiO_2$.

In one embodiment, the composition comprises about 60 wt % to 70 wt % of $Al_2O_3$, about 25 wt % to 30 wt % MgO, and about 5 wt % to 10 wt % $SiO_2$.

In one embodiment, the composition comprises about 65 wt % to 70 wt % of $Al_2O_3$, about 20 wt % to 25 wt % MgO, and about 10 wt % to 15 wt % $SiO_2$.

In one embodiment, the composition comprises about 70 wt % to 80 wt % of $Al_2O_3$, about 10 wt % to 15 wt % MgO, and about 5 wt % to 20 wt % $SiO_2$.

At block 320, a body is formed from the ceramic powder. In one embodiment, the powder is formed into a ceramic green body prior to heating (e.g., sintering).

At block 330, the ceramic powder is heated to induce formation of a solid ceramic material, for example, by sintering the powder. In some embodiments, the solid ceramic material is formed by sintering the composition at a temperature of about 1000° C. to about 1600° C. (e.g., about 1400° C.) for a duration of about 2 minutes to about 10 hours (e.g., 4 hours). In some embodiments, the sintering is performed using pressless sintering, hot press sintering, hot isostatic press (HIP) sintering, spark plasma sintering (SPS), or any other suitable sintering technique.

The resulting ceramic material may comprise at least one phase, such as a sapphirine phase, a cordierite phase, a spinel phase, or an enstatite phase. In some embodiments, the ceramic material comprises a sapphirine main phase and a cordierite sub-phase. In some embodiments, the ceramic material comprises a spinel main phase and an enstatite sub-phase. In some embodiments, the ceramic material is dense having substantially no observable pores.

In some embodiments, the ceramic material is thermal shock resistant up to about 200° C., about 225° C., about 250° C., about 275° C., about 300° C., about 325° C., about 350° C., or greater. In some embodiments, an erosion rate of the ceramic material when exposed to plasma is within about 50% of an erosion rate for ceramic material consisting essentially of $Y_2O_3$.

In some embodiments, the ceramic material is substantially free of impurities. In some embodiments, a total amount of bulk impurities in the ceramic material is less than 150 ppm, less than 125 ppm, less than 100 ppm, less than 75 ppm, or less than 50 ppm. In some embodiments, a total amount of calcium in the ceramic material is less than 100 ppm, less than 50 ppm, or less than 25 ppm.

At block 340, one or more coatings may optionally be formed on the ceramic material. Such coatings may be deposited, for example, by ALD, CVD, plasma-spraying, or any other suitable deposition technique. In one embodiment, one or more of the coatings is a rare earth metal-containing coating including one or more of yttrium, erbium, lanthanum, lutetium, scandium, gadolinium, samarium, and/or dysprosium. For example, the rare earth metal-containing coating may include yttria ($Y_2O_3$), yttrium fluoride ($YF_3$), yttrium oxyfluoride ($Y_xO_yF_z$), yttrium zirconium oxide (YZrO), erbium oxide ($Er_2O_3$), erbium fluoride ($ErF_3$), erbium oxyfluoride ($Er_xO_yF_z$), erbium aluminum oxide ($Er_3Al_5O_{12}$), dysprosium oxide ($Dy_2O_3$), dysprosium fluoride ($DyF_3$), dysprosium oxyfluoride ($Dy_xO_yF_z$), gadolinium oxide ($Gd_2O_3$), gadolinium fluoride ($GdF_3$), gadolinium oxyfluoride ($Gd_xO_yF_z$), scandium oxide ($Sc_2O_3$), scandium fluoride ($ScF_3$), scandium oxyfluoride (ScOF), and so on. In some embodiments, the coating is polycrystalline $Y_2O_3$, $YF_3$, or $Y_xO_yF_z$. In other embodiments, the coating is amorphous $Y_2O_3$, $YF_3$, or $Y_xO_yF_z$. In one embodiment, the rare earth metal-containing coating may be co-deposited with another coating material. For example, a rare earth metal-containing oxide may be mixed with one or more other rare earth compounds such as $Y_2O_3$, gadolinium oxide ($Gd_2O_3$) and/or erbium (e.g., $Er_2O_3$). A yttrium-containing oxide for the coating may be, for example, $Y_xDy_yO_z$, $Y_xGd_yO_z$, or $Y_xEr_yO_z$. The yttrium-containing oxide may be $Y_2O_3$ having a cubic structure with space group Ia-3 (206). The subscripts x, y, and z, may independently range, for example, from 0.1 to 10.

In one embodiment, the rare earth metal-containing coating is one of $Y_2O_3$, $Y_xZr_yO_z$, YZrOF, $Y_3Al_5O_{12}$ (YAG), $Y_4Al_2O_9$ (YAM), $YF_3$, $Y_xO_yF_z$, $Er_2O_3$, $Er_3Al_5O_{12}$ (EAG), $ErF_3$, $Er_xO_yF_z$, $La_2O_3$, $Lu_2O_3$, $Sc_2O_3$, $ScF_3$, $Sc_xO_yF_z$, $Gd_2O_3$, $Sm_2O_3$$Dy_2O_3$, or $Nd_2O_3$. The rare earth metal-containing coating may also be $YAlO_3$ (YAP), $Er_4Al_2O_9$ (EAM), $ErAlO_3$ (EAP), $Gd_4Al_2O_9$, $GdAlO_3$, $Nd_3Al_5O_{12}$, $Nd_4Al_2O_9$, $NdAlO_3$, a ceramic compound composed of $Y_4Al_2O_9$ and a solid-solution of $Y_2O_3$—$ZrO_2$, or any other coating composition described herein other ternary variants of lanthanum, lutetium, scandium, gadolinium, samarium or dysprosium, or any other rare earth metal-containing compound discussed herein. Any of the aforementioned rare earth metal-containing materials may include trace amounts of other materials such as $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides.

In some embodiments, the rare earth metal-containing coating comprises $Y_2O_3$, $ZrO_2$, and/or $Al_2O_3$ in amounts selected from the following compositions: $Y_2O_3$ in a range of 50-75 mol %, $ZrO_2$ in a range of 10-30 mol %, and $Al_2O_3$ in a range of 10-30 mol %; $Y_2O_3$ in a range of 40-99 mol %, $ZrO_2$ in a range of 1-60 mol %, and $Al_2O_3$ in a range of 0-10 mol %; $Y_2O_3$ in a range of 60-75 mol %, $ZrO_2$ in a range of 20-30 mol %, and $Al_2O_3$ in a range of 0-5 mol %; $Y_2O_3$ in a range of 60-70 mol %, $ZrO_2$ in a range of 30-40 mol %, and $Al_2O_3$ in a range of 0-10 mol %; $Y_2O_3$ in a range of 50-60 mol % and $ZrO_2$ in a range of 40-50 mol %; $Y_2O_3$ in a range of 40-60 mol %, $ZrO_2$ in a range of 30-50 mol %, and $Al_2O_3$ in a range of 10-20 mol %; $Y_2O_3$ in a range of 40-50 mol %, $ZrO_2$ in a range of 20-40 mol %, and $Al_2O_3$ in a range of 20-40 mol %; $Y_2O_3$ in a range of 70-90 mol %, $ZrO_2$ in a range of 0-20 mol %, and $Al_2O_3$ in a range of 10-20 mol %; $Y_2O_3$ in a range of 60-80 mol %, $ZrO_2$ in a range of 0-10 mol %, and $Al_2O_3$ in a range of 20-40 mol %; $Y_2O_3$ in a range of 40-60 mol %, $ZrO_2$ in a range of 0-20 mol %, and $Al_2O_3$ in a range of 30-40 mol %; $Y_2O_3$ in a range of 30-60 mol %, $ZrO_2$ in a range of 0-20 mol %, and $Al_2O_3$ in a range of 30-60 mol %; $Y_2O_3$ in a range of 20-40 mol %, $ZrO_2$ in a range of 20-80 mol %, and $Al_2O_3$ in a range of 0-60 mol %; $Y_2O_3$ in a range of 0-10 mol %, $ZrO_2$ in a range of 20-30 mol %, and $Al_2O_3$ in a range of 50-60 mol %; $Y_2O_3$ in a range of 0-10 mol %, $ZrO_2$ in a range of 20-30 mol %, and $Al_2O_3$ in a range of 40-50 mol %; $Y_2O_3$ in a range of 0-10 mol %, $ZrO_2$ in a range of 10-20 mol %, and $Al_2O_3$ in a range of 50-60 mol %; $Y_2O_3$ in a range of 0-10 mol %, $ZrO_2$ in a range of 10-20 mol %, and $Al_2O_3$ in a range of 40-50 mol %; $Y_2O_3$ in a range of 10-20 mol %, $ZrO_2$ in a range of 20-30 mol %, and $Al_2O_3$ in a range of 50-60 mol %; $Y_2O_3$ in a range of 10-20 mol %, $ZrO_2$ in a range of 20-30 mol %, and $Al_2O_3$ in a range of 40-50 mol %; $Y_2O_3$ in a range of 10-20 mol %, and $Al_2O_3$ in a range of 10-20 mol %, $ZrO_2$ in a range of 10-20 mol %, and $Al_2O_3$ in a range of 50-60 mol %; $Y_2O_3$ in a range of 10-20 mol %, $ZrO_2$ in a range of 10-20 mol %, and $Al_2O_3$ in a range of 40-50 mol %; $Y_2O_3$ in a range of 0-10 mol %, $ZrO_2$ in a range of 40-50 mol %, and $Al_2O_3$ in a range of 10-20 mol %; $Y_2O_3$ in a range of 0-10 mol %, $ZrO_2$ in a range of 40-50 mol %, and $Al_2O_3$ in a range of 20-30 mol %; $Y_2O_3$ in a range of 0-10 mol %, $ZrO_2$ in a range of 50-60 mol %, and $Al_2O_3$ in a range of 10-20 mol %; $Y_2O_3$ in a range of 0-10 mol %, $ZrO_2$ in a range of 50-60 mol %, and $Al_2O_3$ in a range of 20-30 mol %; $Y_2O_3$ in a range of 10-20 mol %, $ZrO_2$ in a range of 40-50 mol %, and $Al_2O_3$ in a range of 10-20 mol %; $Y_2O_3$ in a range of 10-20 mol %, $ZrO_2$ in a range of 40-50 mol %, and $Al_2O_3$ in a range of 20-30 mol %; $Y_2O_3$ in a range of 10-20 mol %, $ZrO_2$ in a range of 50-60 mol %, and $Al_2O_3$ in a range of 10-20 mol %; $Y_2O_3$ in a range of 10-20 mol %, $ZrO_2$ in a range of 50-60 mol %, and $Al_2O_3$ in a range of 20-30 mol %; and $Y_2O_3$ in a range of 60-65 mol %, $ZrO_2$ in a range of 20-25 mol %, and $Al_2O_3$ as the balance.

In some embodiments, the rare earth metal-containing coating comprises $Y_2O_3$ and $ZrO_2$ in amounts selected from the following compositions: $Y_2O_3$ in a range of 1-99 mol % and $ZrO_2$ in a range of 1-99 mol %; $Y_2O_3$ in a range of 1-50 mol % and $ZrO_2$ in a range of 50-99 mol %; $Y_2O_3$ in a range of 50-99 mol % and $ZrO_2$ in a range of 1-50 mol %; $Y_2O_3$ in a range of 50-75 mol % and $ZrO_2$ in a range of 25-50 mol %; $Y_2O_3$ in a range of 40-61 mol % and $ZrO_2$ in a range of 39-60 mol %; $Y_2O_3$ in a range of 65-99 mol % and $ZrO_2$ in a range of 1-35 mol %; $Y_2O_3$ in a range of 65-80 mol % and $ZrO_2$ in a range of 20-35 mol %; $Y_2O_3$ in a range of 60-70 mol % and $ZrO_2$ in a range of 30-40 mol %; $Y_2O_3$ in a range of 1-11 mol % and $ZrO_2$ in a range of 89-99 mol %; $Y_2O_3$ in a range of 11-21 mol % and $ZrO_2$ in a range of 79-89 mol %; $Y_2O_3$ in a range of 21-31 mol % and $ZrO_2$ in a range of 69-79 mol %; $Y_2O_3$ in a range of 31-41 mol % and $ZrO_2$ in a range of 59-69 mol %; $Y_2O_3$ in a range of 41-51 mol % and $ZrO_2$ in a range of 49-59 mol %; $Y_2O_3$ in a range of 51-61 mol % and $ZrO_2$ in a range of 39-49 mol %; $Y_2O_3$ in a range of 61-71 mol % and $ZrO_2$ in a range of 29-39 mol %; $Y_2O_3$ in a range of 71-81 mol % and $YF_3$ in a range of 19-29 mol %; $Y_2O_3$ in a range of 81-91 mol % and $YF_3$ in a range of 9-19 mol %; and $Y_2O_3$ in a range of 91-99 mol % and $YF_3$ in a range of 1-9 mol %.

In some embodiments, the rare earth metal-containing coating comprises $Y_2O_3$, $ZrO_2$, $Er_2O_3$, $Gd_2O_3$, and/or $SiO_2$ in amounts selected from the following compositions: $Y_2O_3$ in a range of 40-45 mol %, $ZrO_2$ in a range of 0-10 mol %, $Er_2O_3$ in a range of 35-40 mol %, $Gd_2O_3$ in a range of 5-10 mol %, and $SiO_2$ in a range of 5-15 mol %; $Y_2O_3$ in a range of 30-60 mol %, $ZrO_2$ in a range of 0-20 mol %, $Er_2O_3$ in a range of 20-50 mol %, $Gd_2O_3$ in a range of 0-10 mol %, and $SiO_2$ in a range of 0-30 mol %; or $Y_2O_3$ in a range of 30-45 mol %, $ZrO_2$ in a range of 5-15% mol %, $Er_2O_3$ in a range of 25-60 mol %, and $Gd_2O_3$ in a range of 0-25 mol %.

In some embodiments, the rare earth metal-containing coating comprises $Y_2O_3$ and $YF_3$ in amounts selected from the following compositions: $Y_2O_3$ in a range of 1-99 mol % and $YF_3$ in a range of 1-99 mol %; $Y_2O_3$ in a range of 1-10 mol % and $YF_3$ in a range of 90-99 mol %; $Y_2O_3$ in a range of 11-20 mol % and $YF_3$ in a range of 80-89 mol %; $Y_2O_3$ in a range of 21-30 mol % and $YF_3$ in a range of 70-79 mol %; $Y_2O_3$ in a range of 31-40 mol % and $YF_3$ in a range of 60-69 mol %; $Y_2O_3$ in a range of 41-50 mol % and $YF_3$ in a range of 50-59 mol %; $Y_2O_3$ in a range of 51-60 mol % and $YF_3$ in a range of 40-49 mol %; $Y_2O_3$ in a range of 61-70 mol % and $YF_3$ in a range of 30-39 mol %; $Y_2O_3$ in a range of 71-80 mol % and $YF_3$ in a range of 20-29 mol %; $Y_2O_3$ in a range of 81-90 mol % and $YF_3$ in a range of 10-19 mol %; $Y_2O_3$ in a range of 91-99 mol % and $YF_3$ in a range of 1-9 mol %.

Referring to FIG. 3B, at block 360, a ceramic powder comprising $Al_2O_3$, MgO, and $SiO_2$ is provided. Block 350 may be identical or similar to block 300.

At block 370, a coating of the ceramic material is formed from the ceramic powder. In one embodiment, the powder is prepared for use in a coating deposition technique, including, but not limited to a powder plasma spray process or a solution plasma spray process. In some embodiments, the coating is formed on a surface of a component by plasma-spraying the powder. In some embodiments for which precursors are used instead of powders, the coating is formed on the surface by a deposition technique such as ALD, CVD, solution precursor plasma-spraying, or another suitable method. In some embodiments, the power may be heated during or after formation of the ceramic coating. The resulting ceramic material may comprise at least one phase, such as a sapphirine phase, a cordierite phase, a spinel phase, or an enstatite phase. In some embodiments, the ceramic material comprises a sapphirine main phase and a cordierite sub-phase. In some embodiments, the ceramic material comprises a spinel main phase and an enstatite sub-phase. In some embodiments, the ceramic material is dense having substantially no observable pores.

In some embodiments, the ceramic material is thermal shock resistant up to about 200° C., about 225° C., about 250° C., about 275° C., about 300° C., about 325° C., about 350° C., or greater. In some embodiments, an erosion rate of the ceramic material when exposed to plasma is within about 50% of an erosion rate for ceramic material consisting essentially of $Y_2O_3$.

In some embodiments, the ceramic material is substantially free of impurities. In some embodiments, a total amount of bulk impurities in the ceramic material is less than 150 ppm, less than 125 ppm, less than 100 ppm, less than 75 ppm, or less than 50 ppm. In some embodiments, a total amount of calcium in the ceramic material is less than 100 ppm, less than 50 ppm, or less than 25 ppm.

At block 380, one or more coatings may optionally be formed on the ceramic material. Block 380 may be the same as or similar to block 340.

It is to be understood that the foregoing ranges are illustrative, and some variation may exist in the limits of each compound. For example, recitation of "$Y_2O_3$ in a range of 41-50 mol %" is understood to include all possible quantities of $Y_2O_3$ from and including 41 mol % up to and including 50 mol %, as well as from about 41 mol % up to about 50 mol % to account for approximations and measurement uncertainty.

ILLUSTRATIVE EXAMPLES

The following examples are set forth to assist in understanding the disclosure and should not, of course, be construed as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein. The ceramic materials of these examples may be produced, for example, by performing the method 300 described above.

Example 1

A ceramic material was formed as follows: a raw powder composition comprising 60 wt % of $Al_2O_3$, 30 wt % of MgO, and 10 wt % of $SiO_2$ was packed to form a ceramic green body, which was pressless sintered at a temperature of 1400° C. for 4 hours under an air environment.

Example 2

A ceramic material was formed using a similar method as Example 1, except that the raw powder composition comprised 65 wt % of $Al_2O_3$, 20 wt % of MgO, and 15 wt % of $SiO_2$.

Experimental Results

Figure 4:
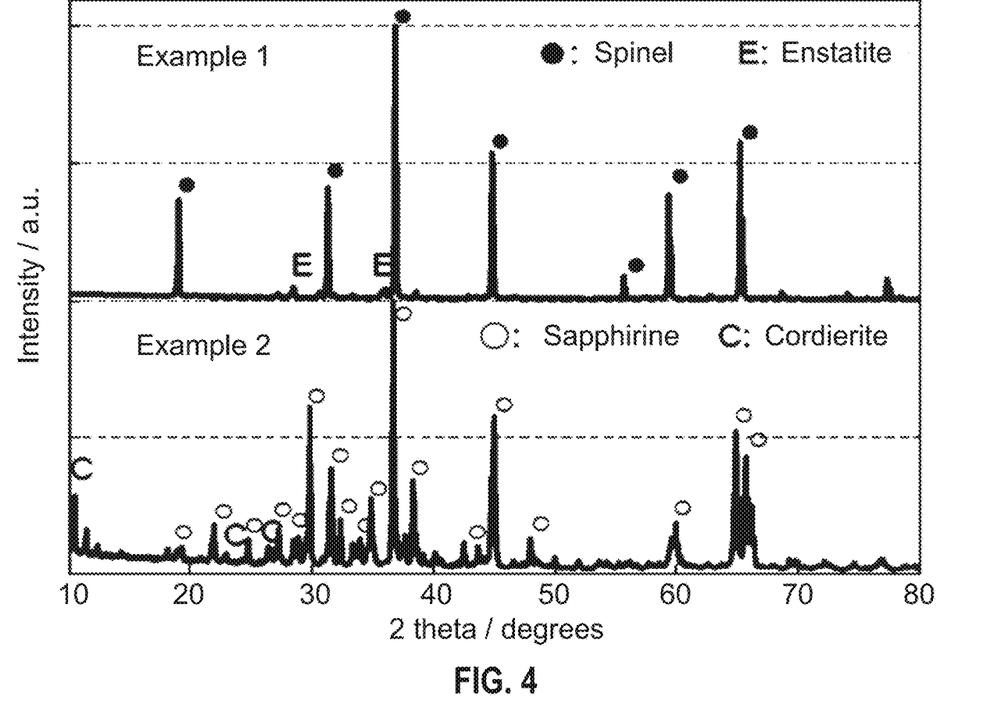
FIG. 4 shows x-ray diffraction (XRD) spectra for exemplary ceramic materials formed in accordance with embodiments of the disclosure.

FIG. 4 shows XRD spectra for each of Example 1 and 2. A spinel main phase and an enstatite sub-phase were observable in the spectra of Example 1, and a sapphirine main phase and a cordierite sub-phase were observable in the spectra of Example 2. Examples 1 and 2 are summarized in Table 1. Both were sintered under the same conditions, with the phase differences resulting from variations in the starting powder compositions. It is expected that other phases may be present by further varying the starting compositions as well as varying the sintering conditions.

TABLE 1

Example Summary

|  |  | Example 1 | Example 2 |
|---|---|---|---|
| Starting powder composition (wt %) | $Al_2O_3$ | 60 | 65 |
|  | MgO | 30 | 20 |
|  | $SiO_2$ | 10 | 15 |
| Ceramic material (post-sintering) | Main phase | Spinel ($MgAl_2O_4$) | Sapphirine ($Mg_4Al_{10}Si_2O_{23}$) |
|  | Sub-phase | Enstatite ($MgSiO_3$) | Cordierite ($Mg_2Al_4Si_5O_{18}$) |

Figure 5:
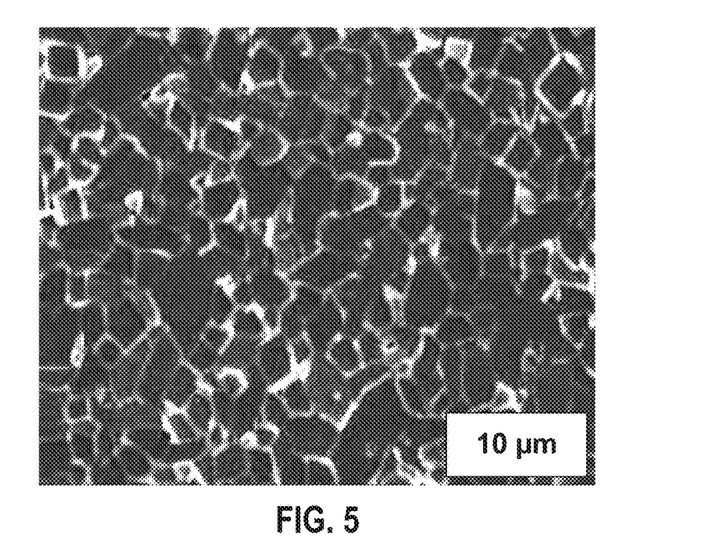
FIG. 5 shows a scanning electron micrograph of the surface of an exemplary ceramic material formed in accordance with embodiments of the disclosure.
Figure 6A:
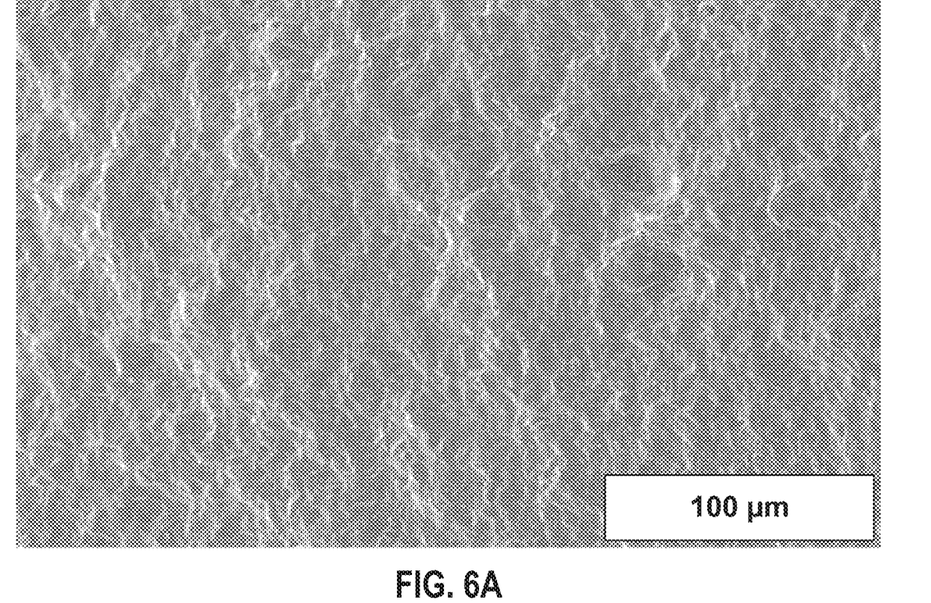
FIG. 6A shows a scanning electron micrograph of a fractured surface of a ceramic material formed in accordance with embodiments of the disclosure.
Figure 6B:
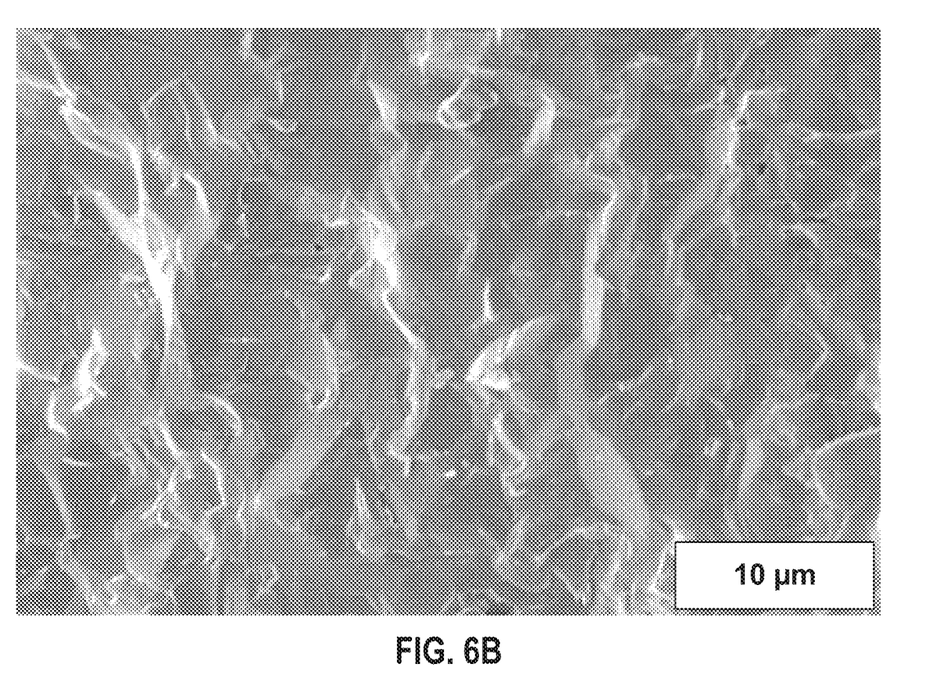
FIG. 6B shows a further magnified view of the fractured surface of the ceramic material formed in accordance with embodiments of the disclosure.

FIG. 5 shows a scanning electron micrograph of the surface of Example 2. Each of Examples 1 and 2 exhibited a grain size ranging from 1 μm to 3 μm on their surfaces. FIGS. 6A and 6B show scanning electron micrographs of a fractured surface of Example 2. The micrographs reveal elongated cross grains of 1 μm to 3 μm, indicating a transgranular fracture mechanism. Moreover, the ceramic was dense with no observable pores.

Figure 7:
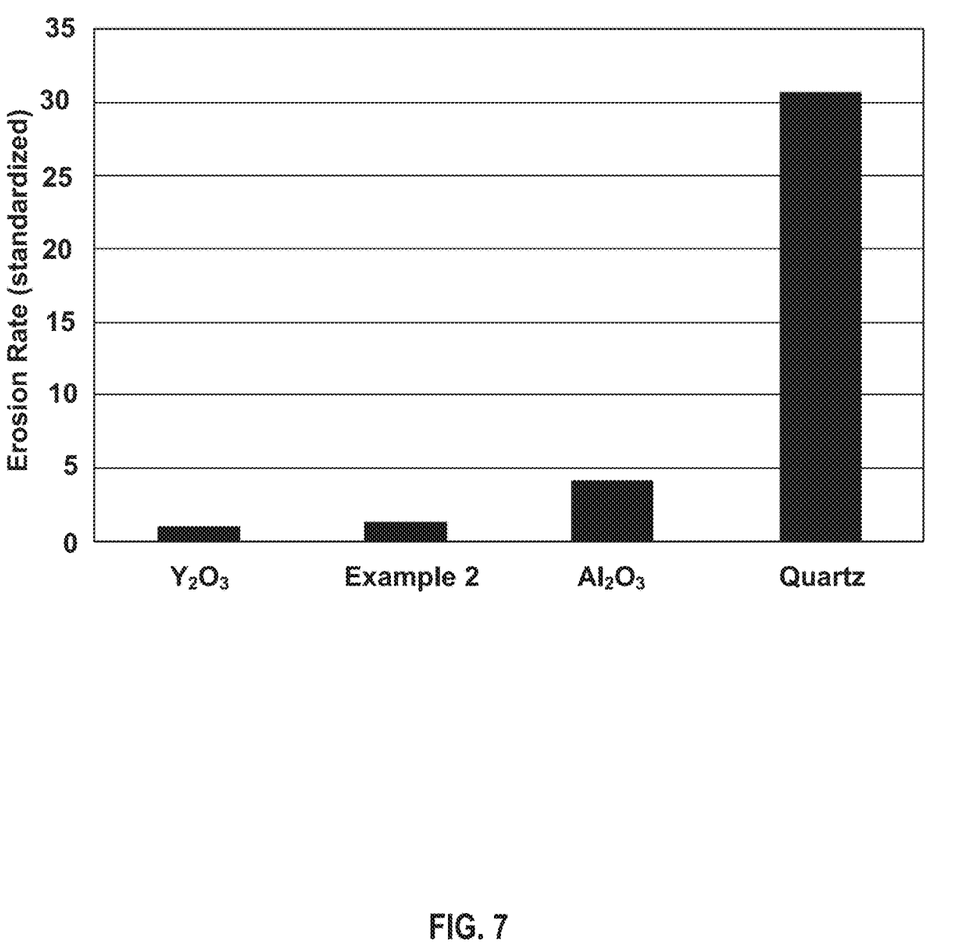
FIG. 7 compares the erosion rates for various ceramic materials to an exemplary ceramic material formed in accordance with embodiments of the disclosure.

FIG. 7 compares the erosion rates for various ceramic materials when exposed to an $NF_3$-based plasma under the same conditions. The erosion rates are shown in units that have been standardized to the erosion rate of a comparative $Y_2O_3$ sample. Example 2 exhibited a slightly higher erosion rate compared to $Y_2O_3$ (within about 50% of the erosion rate for $Y_2O_3$), but had a significantly lower erosion rate compared to $Al_2O_3$ and quartz. As discussed throughout this disclosure, a ceramic material can be said to have high erosion resistance when an erosion rate is within 50% of the erosion rate of $Y_2O_3$ or lower under substantially similar reaction conditions.

Table 2 summarizes various physical, mechanical, thermal, and electrical properties of Example 2. Thermal shock resistance, as discussed throughout this disclosure, was measured by determining the temperature at which a sample on a small coupon develops visible cracks after maintaining the sample at that temperature in a furnace or on a hot plate for about 10 minutes and then immediately submerging the sample in room temperature water followed by air drying. Using this test, Example 2 exhibited a thermal shock resistance of up to 340° C., which was significantly higher than the thermal shock resistance of up to 150° C. that was observed for $Y_2O_3$. Thus, Example 2 exhibited a higher thermal shock resistance than $Y_2O_3$ and a high erosion resistance that was comparable to that of $Y_2O_3$.

Glow discharge mass spectrometry (GDMS) was performed on Example 2 to identify trace elements in the bulk sample, with the results shown in Table 3. A total amount of trace metals was about 110 ppm, with the majority being calcium.

Inductively coupled plasma mass spectrometry (ICP-MS) was performed on Example 2 to identify trace elements at the surface of the sample, with the results shown in Table 4. Elemental aluminum was mostly observed, which is believed to be contributed by the $Al_2O_3$ in the starting material.

TABLE 2

Ceramic material properties (room temperature ("RT") is 20-22° C.)

| Physical properties | Bulk density (relative density) | | 3.12 g/cm³ (≥99%) |
|---|---|---|---|
| | Grain size (max/min) | | 5.0 μm (5.4/0.4 μm) |
| | Average grain size | | 2.3 μm |
| Mechanical properties | Mean flexural strength | RT/400° C. | 290 MPa/160 MPa |
| | Minimum flexural strength | RT/400° C. | 240 MPa/130 MPa |
| | Fracture toughness | | 2.2 MPa · m$^{1/2}$ |
| | Vickers hardness | | HV 1200 |
| | Young's modulus | | 210 GPa |
| Thermal properties | Thermal conductivity | RT | 5.6 W/(m · K) |
| | Thermal shock | | 340° C. |
| | Thermal expansion | –400° C. | $4.2 \times 10^{-6}$/° C. |
| | | –900° C. | $5.1 \times 10^{-6}$/° C. |
| Electrical properties | Volume resistivity | RT | $9 \times 10^{15}$ Ω/cm |
| | | 300° C. | $5 \times 10^{12}$ Ω/cm |
| | | 600° C. | $4 \times 10^{9}$ Ω/cm |
| | Breakdown voltage | | 7 kV/mm |
| | Dielectric constant | 13.56 MHz | 6.9 |
| | Dielectric loss tangent | $\times 10^{-4}$ | <1 |

TABLE 3

Bulk purity of sintered ceramic material measured with GDMS

| Element | Concentration (ppm) |
|---|---|
| Li | <0.2 |
| B | 1.8 |
| Na | 31 |
| K | 4.5 |
| Mg | 1.2 |
| Ca | 40 |
| Zn | <1.0 |
| Cr | <0.2 |
| Cu | 23 |
| Fe | 5.5 |
| Ni | <0.5 |
| Ti | 1.4 |
| Mn | <0.1 |

TABLE 4

Surface purity of sintered ceramic material measured with ICP-MS

| Element | Concentration (E10 atoms/cm²) |
|---|---|
| Al | 54,773 |
| Ca | 402 |
| Cr | 2 |
| Cu | 47 |
| Fe | 15 |

TABLE 4-continued

Surface purity of sintered ceramic material measured with ICP-MS

| Element | Concentration (E10 atoms/cm²) |
|---|---|
| Mg | 162 |
| Mn | 16 |
| Ni | 45 |
| K | <5 |
| Na | 52 |
| Ti | 2 |
| Zn | 98 |

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the embodiments of the present disclosure. Thus, the specific details set forth are merely exemplary. Particular embodiments may vary from these exemplary details and still be contemplated to be within the scope of the present disclosure. These aforementioned embodiments are not intended to be limiting, and other embodiments not expressly disclosed are complemented, which may be one of several combinations or permutations of the various embodiments described herein.

It should be noted that different references to "an" or "one" embodiment in this disclosure are not necessarily to the same embodiment, and such references mean at least one. Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±1%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A component adapted for use in a semiconductor processing chamber, the component comprising a ceramic material formed from a composition comprising:
    about 55 wt % to 70 wt % of $Al_2O_3$;
    about 25 wt % to 35 wt % of MgO; and
    about 5 wt % to 20 wt % of $SiO_2$, provided that the amounts of each of the $Al_2O_3$, the MgO, and the $SiO_2$ sum to 100 wt % or less.

2. The component of claim 1, wherein the ceramic material comprises at least one phase comprising one or more of a sapphirine phase, a cordierite phase, a spinel phase, or an enstatite phase.

3. The component of claim 1, wherein the ceramic material comprises a sapphirine phase.

4. The component of claim 1, wherein the ceramic material is substantially non-porous.

5. The component of claim 1, wherein the ceramic material is thermal shock resistant up to about 300° C.

6. The component of claim 1, wherein the ceramic material is formed by sintering the composition at a temperature of about 1000° C. to about 1600° C. for a duration of about 2 minutes to about 10 hours.

7. The component of claim 1, wherein the ceramic material is formed by plasma-spraying the composition.

8. The component of claim 1, wherein the component is selected from a group consisting of: a heater, an electrostatic chuck, a nozzle, a gas distribution plate, a showerhead, an electrostatic chuck component, a chamber wall, a liner, a liner kit, a gas line, a lid, a chamber lid, a nozzle, a single ring, a processing kit ring, a base, a shield, a plasma screen, a flow equalizer, a cooling base, a chamber viewport, a bellow, a faceplate, and a selectivity modulating device.

9. A ceramic material formed by sintering a composition comprising:
    about 55 wt % to 70 wt % of $Al_2O_3$;
    about 25 wt % to 35 wt % MgO; and
    about 5 wt % to 20 wt % $SiO_2$, provided that the amounts of each of the $Al_2O_3$, the MgO, and the $SiO_2$ sum to 100 wt % or less,
    wherein the ceramic material is substantially non-porous and comprises at least one phase comprising a sapphirine phase.

10. The ceramic material of claim 9, wherein the ceramic material is thermal shock resistant up to about 300° C.

11. A method of forming a component adapted for use in a semiconductor processing chamber, method comprising:
    forming a ceramic material by plasma-spraying a powder composition comprising:
        about 40 wt % to 80 wt % of $Al_2O_3$;
        about 10 wt % to 50 wt % of MgO; and
        about 2 wt % to 30 wt % of $SiO_2$, provided that the amounts of each of the $Al_2O_3$, the MgO, and the $SiO_2$ sum to 100 wt % or less.

12. The method of claim 11, wherein the ceramic material comprises at least one phase comprising one or more of a sapphirine phase, a cordierite phase, a spinel phase, or an enstatite phase.

13. The method of claim 11, wherein the ceramic material is substantially non-porous.

14. The method of claim 11, wherein the powder composition comprises:
    about 55 wt % to 70 wt % of $Al_2O_3$;
    about 25 wt % to 35 wt % MgO; and
    about 5 wt % to 20 wt % $SiO_2$.

15. The method of claim 11, wherein forming the ceramic material from a powder composition comprises:
    sintering the composition at a temperature of about 1000° C. to about 1600° C. for a duration of about 2 minutes to about 10 hours.

* * * * *